United States Patent [19]

Melindo

[11] 4,362,908
[45] Dec. 7, 1982

[54] CIRCUIT ARRANGEMENT FOR EMITTING RINGING SIGNALS IN A TELEPHONE SYSTEM

[75] Inventor: Flavio Melindo, Turin, Italy

[73] Assignee: CSELT - Centro Studi e Laboratori Telecomunicazioni S.p.A., Turin, Italy

[21] Appl. No.: 235,534

[22] Filed: Feb. 18, 1981

[30] Foreign Application Priority Data

Feb. 19, 1980 [IT] Italy .............................. 67252 A/80

[51] Int. Cl.³ ............................................. H04M 3/02
[52] U.S. Cl. ............................ 179/18 HB; 179/84 A
[58] Field of Search .............. 179/18 HB, 84 R, 84 A, 179/51 AA, 18 FA

[56] References Cited

U.S. PATENT DOCUMENTS

| | | | |
|---|---|---|---|
| 3,720,793 | 3/1973 | Hofmann | 179/18 HB |
| 3,941,939 | 3/1976 | Holmes et al. | 179/18 HB |
| 3,978,293 | 8/1976 | Feiner | 179/18 HB |
| 4,087,646 | 5/1978 | Brolin et al. | 179/18 FA |
| 4,262,172 | 4/1981 | Brolin | 179/18 HB |

FOREIGN PATENT DOCUMENTS

| | | | |
|---|---|---|---|
| 2239128 | 2/1974 | Fed. Rep. of Germany | 179/84 A |
| 4424535 | 9/1966 | Japan | 179/84 R |

OTHER PUBLICATIONS

"A New Electronic Ring-Trip Circuit", by Katsumi and Ariizumi, *Review of the Electrical Communication Laboratory*, vol. 19, Nos. 1-2, Jan.-Feb. 1971, pp. 37-43.

*Primary Examiner*—Thomas W. Brown
*Attorney, Agent, or Firm*—Karl F. Ross

[57] ABSTRACT

A circuit arrangement for emitting ringing signals to a subscriber station in response to a call signal electronically generated at a telephone exchange comprises a control unit which, in the presence of such call signal, intermittently reverses a switching relay normally connecting the talking conductors of the subscriber line to monitoring equipment of the exchange whereby these conductors periodically receive a high-voltage ringing current, e.g. of 25 Hz, from a local oscillator in series with a d-c supply. The direct current is blocked by a line-terminating capacitor until the called subscriber lifts the receiver off the hook to close the line loop. If this occurs while the line is connected to the oscillator, a sensor in the control unit detects a significant disparity between the durations of the positive and negative voltage swings in an oscillator cycle and causes the release of the switching relay when that disparity exceeds a dynamic threshold determined by the actual cycle length.

8 Claims, 4 Drawing Figures

CIRCUIT ARRANGEMENT FOR EMITTING RINGING SIGNALS IN A TELEPHONE SYSTEM

FIELD OF THE INVENTION

My present invention relates to a circuit arrangement in an exchange or central office of a telephone system for controlling the emission of a ringing signal to a subscriber station when the exchange receives a call intended for that station, and for detecting the off-hook condition indicating a response of the subscriber to such signal.

BACKGROUND OF THE INVENTION

Telephone subscriber stations are generally equipped with ringers operable by alternating current of rather large amplitude and a low audio frequency, usually between 20 and 50 Hz, arriving from the exchange over the talking conductors of their respective lines. The riner and a blocking capacitor in series therewith are connected across these conductors in parallel with a hook switch which is normally open and whose closure, caused by a lifting of the handset, is detected by line-monitoring equipment which thereupon terminates the emission of ringing current and connects the station to the remote caller.

Modern telephone exchanges operate with electronic circuitry incapable of directly dealing with low-frequency ringing currents of the required intensity. Unless the subscriber stations associated with such an exchange have electronic ringers responsive to low-intensity call signals in a higher audio-frequency range (as disclosed in commonly owned application Ser. No. 229,174 filed Jan. 28, 1981 by Franco Pira et al), it is necessary to provide the exchange itself with circuitry for generating low-frequency oscillations, suitable for driving an electromechanical ringer, upon the reception of an incoming call.

Such an arrangement requires a periodic switchover of the conductors of a called subscriber from the line-monitoring equipment normally connected thereto, upon the occurrence of an incoming-call signal, to an oscillator operating at the proper ringing frequency. If, now, the subscriber lifts the receiver off the hook to close the line loop, this fact cannot be detected by the monitoring equipment while the line conductors are switched to the oscillator so that the line current reaching the speaker of the handset will ring into the subscriber's ear until the end of the signal period in progress. Moreover, since the same oscillator usually serves a number of subscriber lines associated with a given exchange, an undesirable overload may exist at such an instant if several stations are being called simultaneously.

This problem could be avoided by the use of ancillary circuitry designed to detect the closure of the line loop and to communicate this fact to the electronic signaling equipment, yet such a solution would require considerable modification of the normal line-monitoring circuits.

OBJECT OF THE INVENTION

Thus, the object of my present invention is to provide means for detecting the closure of a line loop during the transmission of ringing current to the called station and for thereupon cutting off that transmission independently of the electronic equipment whose incoming-call signal causes the switchover to the ringing-current generator.

SUMMARY OF THE INVENTION

I realize this object, in accordance with my present invention, by the provision of a generator of oscillations of ringing-current frequency superimposed upon a d-c voltage. When a relay operated by switchover means in response to an incoming-call signal connects this generators across the line conductors of the called station, the driving current for the ringer of that station passes through the capacitor in series therewith while the accompanying d-c bias is blocked by that capacitor as long as the hook switch is open. Closure of the hook switch in the off-normal position of the relay significantly unbalances the line current, such unbalance being detected by sensing means connected in that relay position in circuit with the oscillation generator, whereupon the relay is restored to its normal position—in which the conductors are connected to a line extension leading to the line-monitoring equipment—by control means connected to the sensing means.

Pursuant to a more particular feature of my invention, the sensing means designed to detect a significant unbalance of the line current comprises polarity-responsive means connected across an impedance element (preferably a resistor) for determining the direction of current flow therethrough, timing means controlled by the polarity-responsive means for measuring differences—if any—between the durations of current flow in one and in another direction during one oscillator cycle, and comparison means connected to the timing means and to a source of reference value for operating the control means to deactivate the swithover means whenever this reference value is exceeded by a measured duration difference. I further prefer to make the reference value a dynamic threshold varying with changes in the overall duration of an oscillator cycle, as determined by the timing means, in order to take possible fluctuations in cycle length into account when the duration difference is measured in absolute terms with the aid of a pulse counter, for example.

Since transients due to the switchover (or noises due to the chattering of contacts in the case of a switching relay of the electromagnetic type) may create a short-term unbalance unrelated to closure of the hook switch, another feature of my invention resides in the provision of monostable inhibiting means preventing the release of the switching relay during a small initial fraction of a ringing period during which the relay is energized by a pulse generator forming part of the aforementioned switchover means. Thus, the control means serving to restore the relay to normal upon the detection of hook-switch closure may include a gating circuit interposed between the pulse generator and the relay for blocking the energization of the latter in response to a deactivation command from the sensing means, this gating circuit being briefly disabled by the monostable inhibiting mens in response to a leading edge of a relay-energizing pulse. When the deactivation command occurs after the inhibition interval, the blocking effect of the gating circuit may be extended by delay means—also of monostable character—for a time sufficient to insure a release of the relay, e.g. over several oscillator cycles. In the event of a spurious deactivation command, the incoming-call signal is not terminated by the line-monitoring equipment upon the release of the relay so that the same will be promptly re-energized by the pulse generator responsive to that signal.

BRIEF DESCRIPTION OF THE DRAWING

The above and other features of my invention will now be described in detail with reference to the accompanying drawing in which.

SPECIFIC DESCRIPTION

Figure 1:
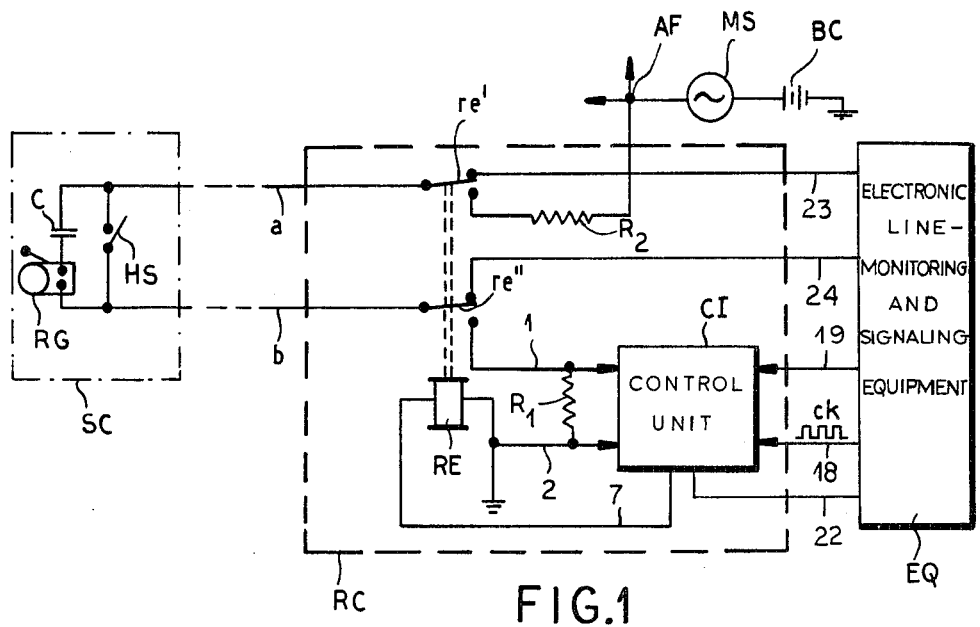
FIG. 1 is a block diagram of a circuit arrangement embodying my invention.

In FIG. 1 I have shown a subscriber station SC of a telephone network linked by talking conductors a, b with an exchange including conventional electronic line-monitoring and signaling equipment EQ along with ringing circuitry RC according to my invention. Only so much of station SC has been illustrated as is necessary for an understanding of the invention, namely a capacitor C in series with an electromechanical ringer RG connected between line conductors a and b in shunt with a normally open hook switch HS.

A switching relay RE forming part of circuitry RC has armatures re', re" normally connecting conductors a and b to respective leads 23, 24 of a line extension terminating at the central-office equipment EQ which detects the open or closed condition of the line loop, receives dial pulses from station SC and establishes calling connections between that station and remote subscribers, all as well known in the art. Upon the arrival of a call from a remote station destined for station SC, equipment EQ emits an incoming-call signal on a lead 19 to a control unit CI together with clock pulse ck on a lead 18. Power is supplied to circuitry RC via a lead 22.

The winding of relay RE is energizable by unit CI, in a manner more fully described hereinafter, via a lead 7 emanating from unit CI. In its off-normal position, relay RE connects line conductor b through a resistor $R_1$ to ground and connects line conductor a through another resistor $R_2$ to an output terminal AF of a local oscillator MS, operating at a low audio frequency such as 25 Hz, whose other terminal is tied to the positive pole of a direct-current source (shown as a battery) BC whose negative pole is grounded. Further leads originating at terminal AF extend to ringing circuits associated with other subscriber lines not shown.

Figure 2:
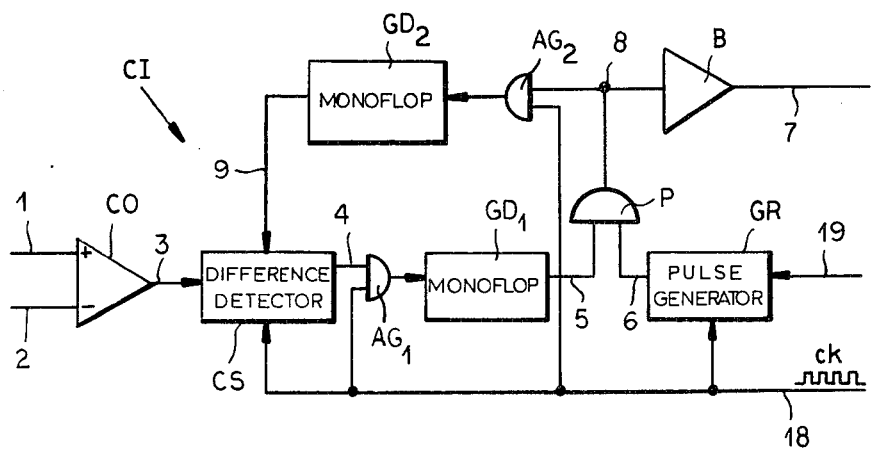
FIG. 2 is a more detailed diagram of a control unit shown in FIG. 1.

As illustrated in FIG. 2, unit CI comprises a polarity-responsive comparator CO with an additive and a subtractive input respectively connected by way of leads 1 and 2 to the ungrounded and to the grounded end of current-sensing resistor $R_1$ (FIG. 1). The output 3 of comparator CO is connected to a difference detector CS, more fully described hereinafter with reference to FIG. 3, which also receives clock pulses ck on lead 18. These clock pulses recur at a cadence much higher than the oscillator frequency, e.g. of 8 kHz, in accordance with the usual sampling rate of PCM systems. Component CS measures the time during which lead 1 is miore positive than lead 2, resulting in a logical "1" on output 3, as well as the time during which the polarity is reversed, marked on that output by a logical "0", and determines the difference (if any) between these two time periods; when that difference exceeds a reference value, varying substantially in proportion to the measured length of an oscillator cycle, a deactivation command emitted on a lead 4 and passed by an AND gate $AG_1$ trips a monoflop $GD_1$ which thereupon de-energizes its normally energized output lead 5 extending to one input of an AND gate P whose other input is tied to a normally de-energized output lead 6 of a pulse generator GR having an input connected to lead 19. In response to the leading edge of an incoming-call signal on that lead, generator GR emits a series of switching pulses in the rhythm of a ringing signal, e.g. with pulse lengths of one second and intervening pauses of four seconds. With AND gate P open in the presence of voltage on lead 5, the switching pulses reach a lead 8 joined through a power amplifier B to the operating lead 7 of relay RE.

When the incoming-call signal on lead 19 is a train of low-voltage pulses of relatively high cadence (on the order of hundreds of Hz), pulse generator GR may be a frequency divider with a multiplicity of cascaded binary stages and with an integrating circuit serving to reset all these stages upon the termination of the incoming-call signal in order to generate the first switching pulse promptly upon a recurrence of that signal.

Output lead 8 of gate P is also connected via an AND gate $AG_2$ to an input of another monoflop $GD_2$ which, on being tripped by the leading edge of a switching pulse from generator GR, briefly de-energizes a normally energized lead 9 extending to an inhibiting input of difference detector CS. This detector is therefore prevented, for a small fraction of a second immediately after a movement of relay armatures re', re" (FIG. 1) into their off-normal position, from emitting a deactivation command on lead 4 if comparator CO happens to sense an unbalance otherwise sufficient to give rise to such a command. AND gates $AG_1$ and $AG_2$ have their other inputs tied to lead 18 whereby monoflops $GD_1$ and $GD_2$ start their respective delay periods at the instant of arrival of a clock pulse ck.

Figure 3:
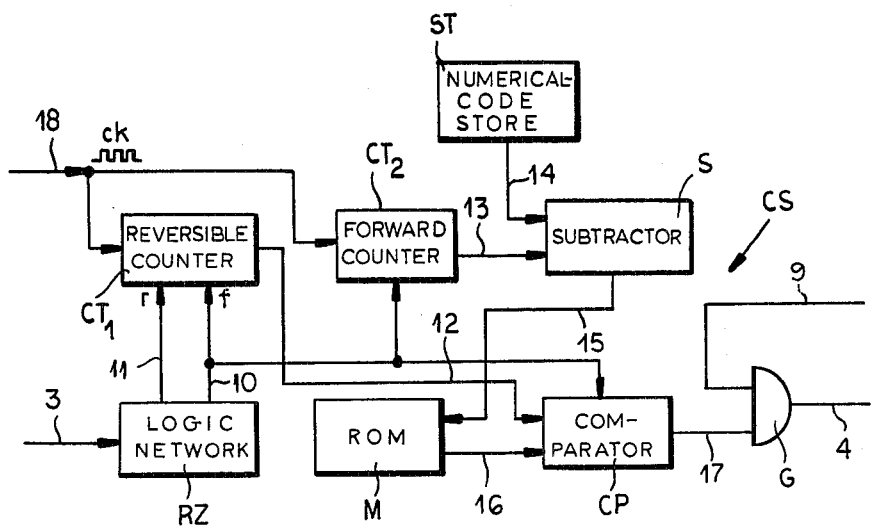
FIG. 3 shows details of a difference detector forming part of the control unit of FIG. 2.

From FIG. 3 it will be noted that difference detector CS includes timing means in the form of two pulse counters $CT_1$, $CT_2$, with stepping inputs connected to lead 18, which are controlled by a logic network RZ whose input is connected to output lead 3 of comparator CO (FIG. 2). Counter $CT_1$ is of the reversible type, with enabling inputs f for forward counting and r for reverse or backward counting respectively connected to outputs leads 10 and 11 of network RZ; counter $CT_2$ counts only forward upon energization of an enabling input tied to lead 10. When the voltage on lead 1 (FIGS. 1 and 2) goes positive, the resulting conduction of comparator CO energizes the lead 10 and, on the first clock pulse ck thereafter appearing on lead 18, causes both counters $CT_1$, $CT_2$ to be reset to zero, but not before the last reading of counter $CT_1$ has been registered in a comparator CP which has a writing input tied to lead 10 and two data inputs respectively connected to an output multiple 12 of counter $CT_1$ and to an output lead 16 of a read-only memory M. An output multiple 13 of counter $CT_2$ extends to one input of an arithmetic element or subtractor S whose other input receives a numerical code, representing the standard or nominal length of an oscillator cycle, on a multiple 14 from a hard-wired store ST. Comparator CP has an output lead 17 extending to an input of an AND gate G whose other input is tied to output lead 9 of monoflop $GD_2$ (FIG. 2) and whose output is the lead 4 carrying the deactivation command generated by detector CS. An address multiple 15 extends from subtractor S to memory M.

Figure 4:
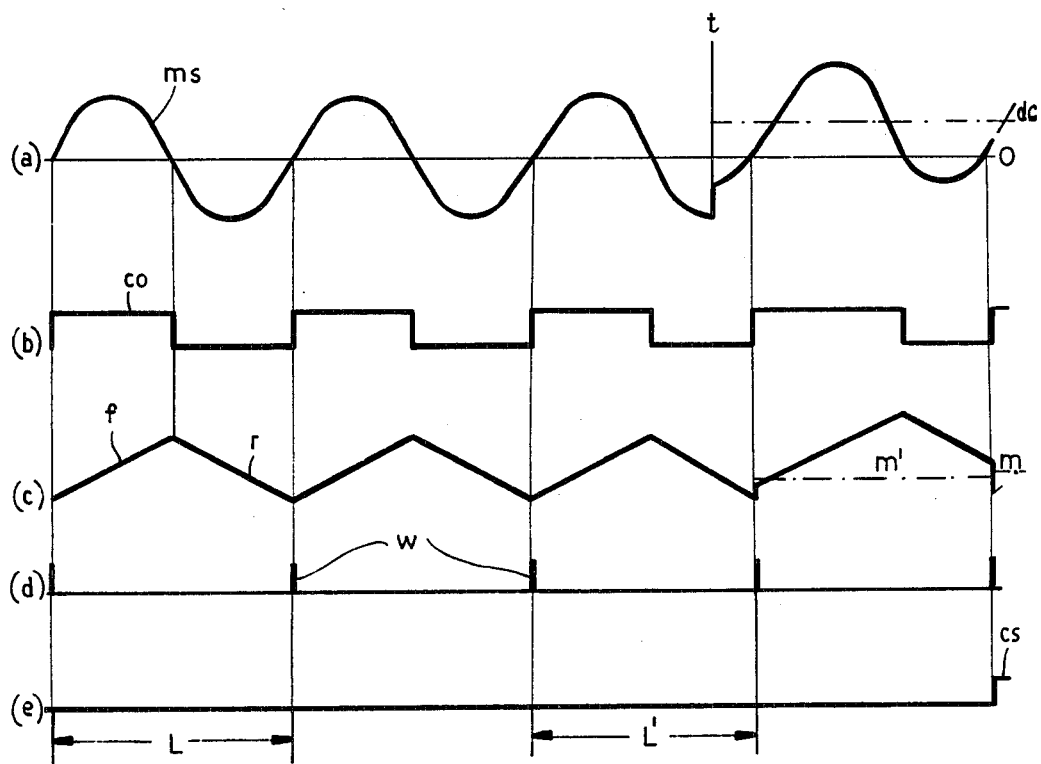
FIG. 4 is a set of graphs relating to the operation of that control unit.

I shall now describe, with reference to FIG. 4, the operation of the ringing circuitry RC shown in FIGS. 1-3.

With relay armatures re', re" in their illustrated normal position, and with subscriber line a, b found idle by the line-monitoring equipment EQ upon the arrival of a call destined for station SC, an incoming-call signal appearing on lead 19 turns on the pulse generator GR to energize the relay RE via AND gate P and amplifier B for a one-second ringing period. The reversal of armatures re', re" now connects oscillator MS in series with battery BC and resistors $R_1$, $R_2$ across line conductors a and b whereby the 25-Hz alternating current from the oscillator passes through capacitor C and actuates the ringer RG. Since the direct current from battery BC is blocked by the capacitor, the current traverses the resistor $R_1$ in two half-cycles of substantially equal duration, as indicated in the left-hand part of graph (a) of FIG. 4 by a sinusoidal voltage wave ms fed by lead 1 to the additive input of comparator CO. The comparator then emits a square wave co, graph (b), on its output lead 3 to logic network RZ, whereby counter $CT_1$ is stepped forward and backward by about the same number of clock pulses as indicated at f and r in graph (c); with the numerical values assumed above, that number will be around 160. At the end of each oscillator cycle, whose length L is measured at the same time by pulse counter $CT_2$, the bidirectional counter $CT_1$ has a reading of approximately zero which is communicated on lead 12 to comparator CP and is registered there by a writing command w, graph (d), when lead 10 is re-energized at the beginning of the next cycle and just before both counters are reset.

The actual length L of an oscillator cycle, measured by counter $CT_2$, may deviate somewhat from its normal length of 40 msec (for an oscillator frequency of 25 Hz) corresponding to a count of 320 clock pulses (for a pulse rate of 8 kHz) which is read out from store ST to arithmetic element S for subtraction from the reading of that counter. The resulting numerical difference, which could be positive, negative or zero, appears on address multiple 15 and causes the readout of an adaptive threshold value from the corresponding cell of memory M as indicated at m in graph (c) of FIG. 4.

Let us assume that the called subscriber lifts the handset of station SC at an instant t, causing closure of hook switch HS. This lets the biasing voltage of battery BC traverse the line loop together with oscillation ms, as indicated at dc in graph (a). In the next cycle, therefore, the sine wave is elevated by the bias dc so that, with the polarities given, the positive voltage swing on lead 1 lasts considerably longer than the negative swing. It will also be noted that the cycle encompassing instant t is somewhat foreshortened to a length L' which causes the readout of a lower threshold m' from memory M, yet in the assumed case the residual count on multiple 12 surpasses the threshold m (now again at or near its normal value) only in the next-following cycle, whereby the deactivation command on lead 4 is generated as indicated at cs in graph (e).

The resulting release of relay RE terminates, at least temporarily, the operation of control unit CI as the flow of line current through sensing resistor $R_1$ is discontinued. With conductors a, b now again connected to line extension 23, 24, the line-monitoring equipment EQ cuts off the incoming-call signal on lead 19 if the line loop is indeed closed. If, however, the unbalance detected by comparator CO was due to a spurious phenomenon, pulse generator GR will continue operating and relay RE will be re-energized, after the end of the delay introduced by monoflop $GD_1$, either in the current ringing period or in the next one.

Since AND gate G is cut off through de-energization of lead 9 by monoflop $GD_2$ at the beginning of any ringing period, monoflop GD, cannot be immediately retriggered in any event.

While several relays RE may be operated simultaneously to connect the oscillator MS across their respective subscriber lines, the corresponding hook switches will generally be closed at different times so that the momentary increases in the output current of that oscillator by the short-circuiting of the respective ringers will be randomly distributed and will not subject it to excessive overloading.

I claim:

1. In a telephone system wherein an exchange is linked with an associated subscriber station via a two-conductor line whose conductors are interconnected at said station by a ringer in series with a capacitor shunted by a normally open hook switch, said ringer being operable in an open state of said hook switch by alternating current of low audio frequency transmitted over said line in response to an incoming-call signal electronically generated at the exchange under the control of line-monitoring equipment which terminates said incoming-call signal upon detecting a closure of said hook switch, the combination therewith of:
   a generator of oscillations of said low audio frequency superimposed upon a d-c voltage;
   a relay having a normal position connecting said conductors to an extension of said line leading to said line-monitoring equipment;
   switchover means operable in the presence of said incoming-call signal to place said relay in an off-normal position in which said conductors are connected to said generator in lieu of said extension whereby said oscillations pass through said capacitor and said ringer to the exclusion of said d-c voltage in the open state of said hook switch;
   sensing means including an impedance element connected by said relay in said off-normal position thereof in series with said generator and said line for detecting a significant unbalance in line current due to closure of said hook switch, said sensing means further comprising polarity-responsive means connected across said impedance element for determining the direction of current flow therethrough, timing means controlled by said polarity-responsive means for measuring a difference between the durations of current flow in a first and in a second direction during one cycle of said low audio frequency, and comparison means connected to said timing means and to a source of reference value; and
   control means connected to said comparison means for deactivating said switchover means upon said difference exceeding said reference value, thereby restoring said relay to said normal position thereof.

2. The combination defined in claim 1 wherein said reference value is a dynamic threshold, said source being controlled by said timing means for varying said threshold in response to changes in the overall length of a cycle of said low audio frequency.

3. The combination defined in claim 2 wherein said impedance element is a resistor, said polarity-responsive means comprising a voltage comparator with inputs connected to opposite ends of said resistor, said timing means including first and second pulse counters with stepping inputs connected to an emitter of clock pulses of a cadence substantially higher than said low audio frequency and logical circuitry driven by said voltage comparator for starting both said first and said second pulse counter from a count of zero upon a predetermined polarity inversion and reversing the mode of operation of said first pulse counter upon an opposite polarity inversion of a voltage drop across said resistor whereby said difference is measured by a residual count of said first pulse counter and said overall length is measured by the final count of said second pulse counter.

4. The combination defined in claim 3 wherein said source comprises arithmetic means connected to said second pulse counter for calculating a deviation of said final count from a standard amount, said source further comprising a read-only memory addressable by said arithmetic means for delivering to said comparison means a reference value determined by the extent of said deviation.

5. The combination defined in claim 1, 2, 3 or 4 wherein said switchover means comprises pulse-generating means triggerable by a leading edge of said call signal for intermittently energizing said relay to establish a series of ringing periods separated by longer-lasting pauses during which said relay is de-energized and returns to said normal position, said control means including a gating circuit interposed between said pulse-generating means and said relay for blocking the energization of the latter in reponse to a deactivation command from said sensing means.

6. The combination defined in claim 5 wherein said control means further includes delay means actuatable by said deactivation command for maintaining the blocking effect of said gating circuit for an extended time sufficient to insure a release of said relay.

7. The combination defined in claim 5 wherein said control means further includes monostable inhibiting means connected to said gating means for disabling said sensing means during a small initial fraction of each ringing period.

8. The combination defined in claim 1, 2, 3 or 4 wherein said generator comprises an oscillator common to a plurality of two-conductor lines leading to respective subscriber stations and a direct-current supply in series with said oscillator.

* * * * *